United States Patent [19]

Krueger

[11] 4,169,306

[45] Oct. 2, 1979

[54] HAND TOOL

[75] Inventor: Wallace F. Krueger, Toledo, Ohio

[73] Assignee: Libbey-Owens-Ford Company, Toledo, Ohio

[21] Appl. No.: 854,506

[22] Filed: Nov. 25, 1977

[51] Int. Cl.[2] .......... B23P 19/04

[52] U.S. Cl. .......... 29/239

[58] Field of Search .......... 29/239, 235; 81/3.46 A, 81/3.33; 269/236

[56] References Cited

U.S. PATENT DOCUMENTS

| | | | |
|---|---|---|---|
| 416,359 | 12/1889 | Cooley | 269/236 |
| 1,113,864 | 10/1914 | Banks | 269/236 |
| 2,454,309 | 11/1948 | Davis | 269/236 |

*Primary Examiner*—James L. Jones, Jr.

*Attorney, Agent, or Firm*—Collins, Oberlin & Darr

[57] ABSTRACT

A tool for detaching a mechanically and adhesively secured retainer member from its mounting. The tool includes a base member supportable on a workpiece and having a lift element extending therethrough for rotary and axial movement relative thereto. The lift element is provided with a radially projecting foot or blade having a sharp edge for penetrating the adhesive material and insertable behind a flange of the retainer member for prying the latter loose from its mounting.

5 Claims, 7 Drawing Figures

HAND TOOL

BACKGROUND OF THE INVENTION

This invention relates to a portable hand tool and, more particularly, to a tool for disengaging and lifting retainer members adhesively secured to glazing panels.

While not limited thereto, the present invention is particularly adapted for use in detaching retainer caps from solar energy collection units. These units generally include an enclosure for housing a metallic heat absorbent plate supported on heat insulating material and covered preferably by spaced inboard and outboard glazing panels. In addition to mechanically interlocking the retainer cap to the enclosure, the former is commonly adhesively secured to the outboard glazing panel in order to provide a fluid tight seal for the unit.

The outboard panel is especially vulnerable to damage during handling and installation and during use because of its exposure to the elements. Accordingly, it sometimes becomes necessary to remove the retainer cap in an effort to replace a damaged outboard glazing panel. However, detachment and removal of the retainer cap has proven difficult because of its adhesive securement to the fragile outboard panel by the mastic sealant. Screw drivers and other makeshift implements often are used to break the cap loose from the outboard panel, sometimes damaging adjacent components of the collector unit.

SUMMARY OF THE INVENTION

Accordingly, a primary object of the present invention is to provide a portable hand tool especially adapted for facilitating the detachment of an adhesively secured retainer member from its connected structure.

A more specific object of this invention is to provide a portable hand tool for detaching a sealed retainer cap from its mounting on a glazing panel for facilitating the removal and/or replacement of glazing panels.

It is a further object of the present invention to provide a portable hand tool which is simple and strong in construction, rugged and durable in use, inexpensive to manufacture, and which expedites removal of a sealed retainer member from its associated structure.

The foregoing and other objects, advantages and characterizing features of the present invention will become clearly apparent from the ensuing detailed description of an illustrated embodiment thereof, taken together with the accompanying drawings wherein like reference numerals denote like parts throughout the various views.

DESCRIPTION OF THE PREFERRED EMBODIMENT

Figure 1:
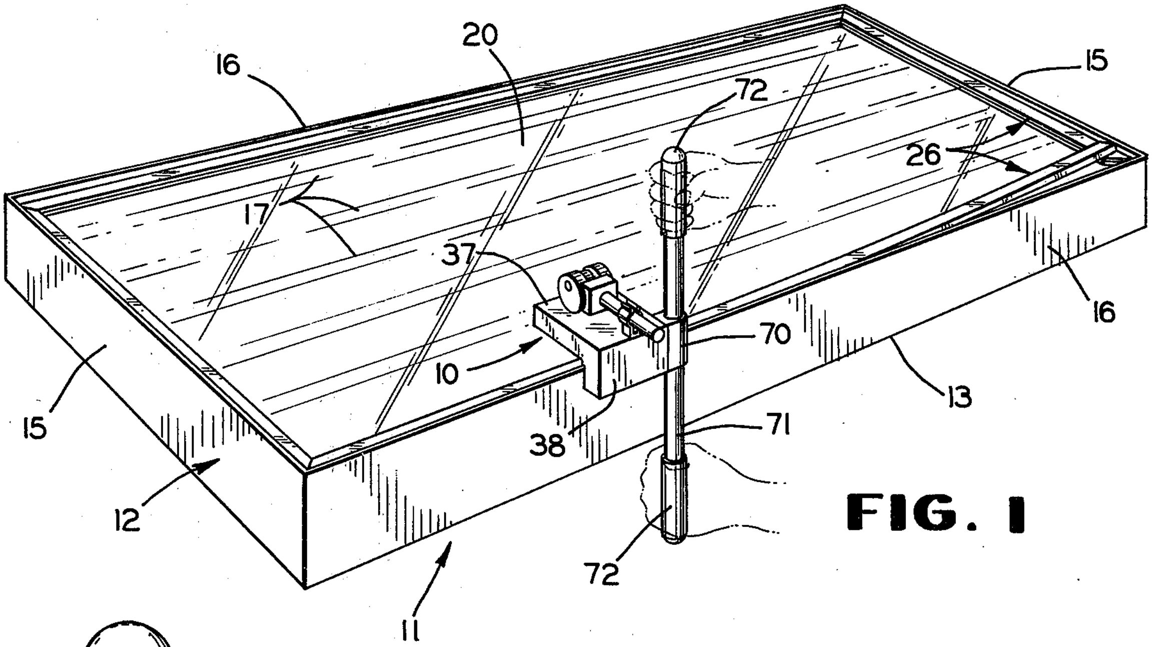
FIG. 1 is a perspective view of a portable tool of this invention, shown in use for detaching a retainer cap from a solar energy collector unit.

Referring now in detail to the illustrative embodiment depicted in the accompanying drawings, there is shown in FIG. 1 a portable hand tool, constructed in accordance with this invention and generally designated 10, supported on the upper surface of a solar energy collector 11. The form of collector 11 illustrated comprises a generally rectangular shaped enclosure 12 having a bottom or base plate 13, a pair of end walls 15 and a pair of side walls 16 suitably secured together to form a rigid, box-like structure.

The enclosure 12 houses a suitable heat collecting plate (not shown) supported on and spaced from the base plate 13 by a suitable layer of heat insulating material (also not shown). A plurality of laterally spaced, heat conducting conduits 17 (FIG. 1) extend longitudinally of the enclosure 12 and are connected at their one ends to a common header for delivering ambient fluid to the conduits and at their other ends to a common header for removing the heated fluid therefrom. Since the collector components so far referred to are well known and, per se, form no part of this invention, it is believed that no further amplification or description thereof is necessary.

The collector 11 includes two transparent sheets or panels 18 and 20 preferably formed of tempered glass. Inboard panel 18 is positioned above the heat collecting or absorbent plate (not shown) in spaced relation thereto and the outboard panel 20 is located above and spaced from panel 18 (FIG. 5) to provide a dead airspace therebetween. The peripheral edge of panel 18 is mounted in a gasket 21, of U-shaped configuration in cross section, extending inwardly around the periphery of the panel 18 and seated in a channel shaped formation 22 provided in the frame of the enclosure 12. The peripheral edge of the outboard panel 20 also is supported and mounted in a U-shaped or channel shaped gasket 23 supported on the upper surface 24 of a protrusion 25 formed as a part of the enclosure 12 and extending inwardly around the periphery thereof.

The entire collector assembly is closed by a retainer cap 26 having an inwardly projecting flange or lip 27 overlying the peripheral edge of outboard panel 20 along the entire periphery thereof and resting on the upper leg 28 of gasket 23 interposed therebetween. The lip 27 extends inwardly past the gasket leg 28 and is adhesively secured to the upper surface of panel 20 by means of a mastic material 29 extending to the inner edge of gasket leg 28 and filling the space between lip 27 and the outboard panel 20 to provide a fluid tight pressure seal therebetween. While preferably the mastic material is formed of silicone, it should be appreciated that any suitable, fluid impermeable sealant can be used, as desired.

The retainer cap 26 also is formed with a vertical leg 30 extending downwardly from the lip 27 and adapted to be received in a recess 31 formed by an upright formation 32 of a right angularly shaped protrusion 33 extending inwardly from the enclosure wall. The leg 30 is bowed or curved in transverse cross section for biased engagement against the side of upright formation 32 of protrusion 33 and forms a tight connection therewith. Additionally, the bowed leg 30 is formed with a shoulder 35 adapted to engage behind an undercut portion formed in the upright formation 32 for locking engagement therewith in the assembled relation. Thus, the retainer cap 26 is mechanically locked to enclosure 12, as well as being adhesively secured to the outboard panel 20.

It can be readily appreciated that the outboard glass panel 20 is especially vulnerable to damage in use as might be caused by wind propelled debris, falling tree branches, vandalism, or by negligence in handling during shipment and storage for example. In any event, replacement of a damaged outboard panel with a fresh one has been difficult. Generally, a screw driver or other makeshift tool has been employed to penetrate the mastic material and break the retainer cap 26 loose from its adhesive securement to the outboard panel and mechanically disengage the same from the collector unit.

Figure 3:
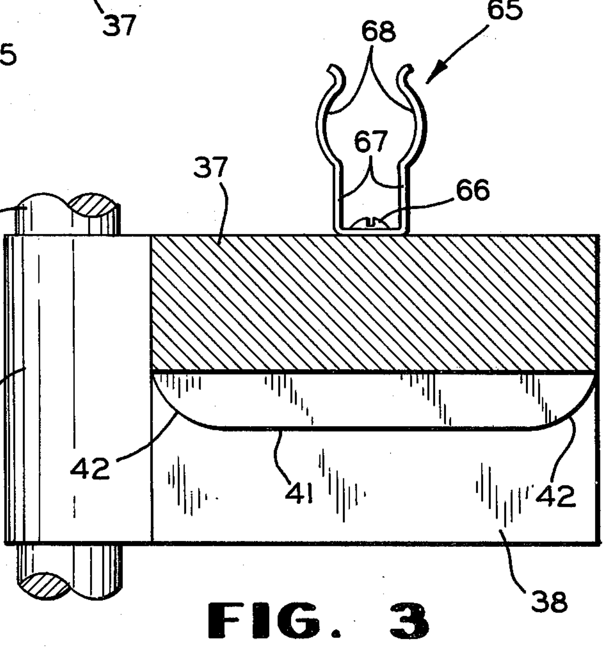
FIG. 3 is a vertical sectional view, on an enlarged scale, taken along the line 3—3 of FIG. 2.
Figure 5:
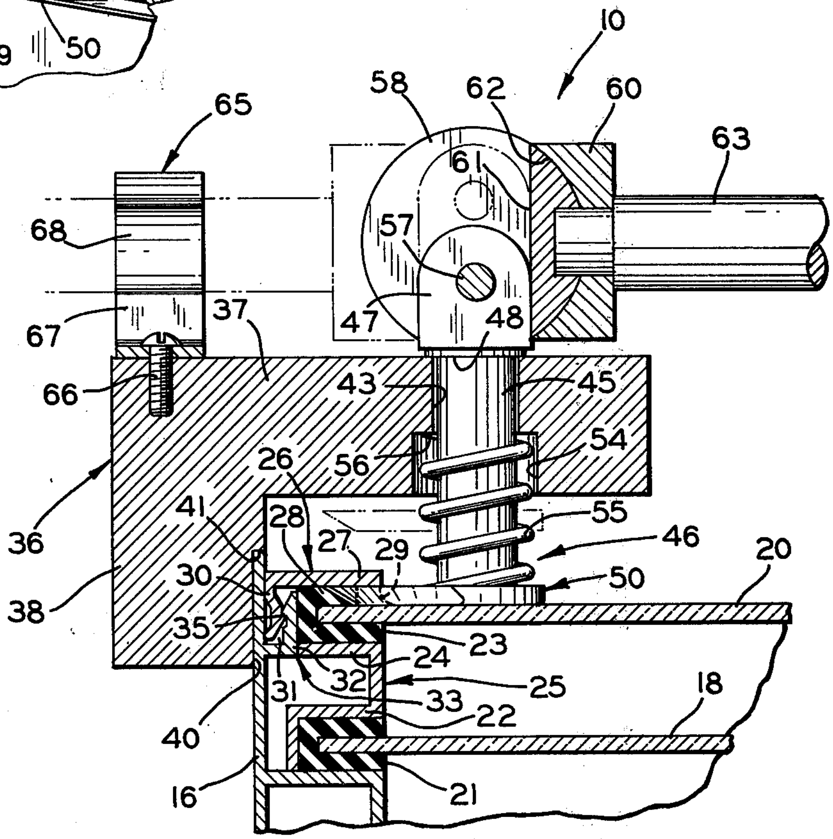
FIG. 5 is a vertical view, on an enlarged scale, taken along the line 5—5 of FIG. 4.

The portable hand tool 10 of the present invention overcomes these shortcomings by facilitating the detachment of a retainer cap from its housing for easy removal therefrom. To this end, the tool 10 comprises an angled body or base member 36 of a generally L-shaped configuration in side elevation having an upper horizontally extending portion 37 and a lower, vertically extending portion 38. The terms upper, lower, horizontal, vertical and the like are relative and are used herein only for convenience of description with reference to the drawings and are not to be taken as limiting the scope of this invention. As best shown in FIG. 5, the inner surface of the vertical portion 38 is formed with an indentation defining a planar vertical surface 40 and a shoulder 41. In use, the shoulder 41 rests on the upper edge of the end or side walls of enclosure 12 with the indented vertical surface 40 bearing against the outer face of such wall. The shoulder 41 is provided with curved, receding surfaces 42 at the opposite ends thereof, as best shown in FIG. 3, to form round, arcuate surfaces facilitating the movement of the tool along the upper edge of the enclosure side or end walls as will hereinafter be described in detail.

Figure 6:
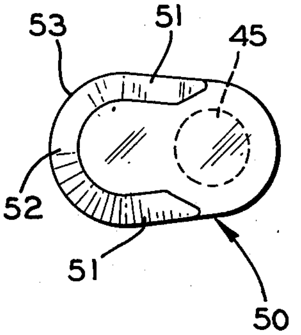
FIG. 6 is a bottom plan view of the blade of the tool shown in FIG. 5.

The horizontal body portions 37 is formed with a vertical bore 43 for receiving and guiding the shank 45 of a lift element 46. The shank 45 is loosely fitted within the bore 43 for free rotational movement therein. The element 46 is provided with an enlarged, flat sided heat formation 47 connected to shank 45 by a neck portion 48 of slightly larger diameter than bore 43 and which bears against the upper flat surface of body portion 37. The lower end of shank 45 is provided with a radially projecting blade or foot 50 which gradually widens in width from the shank 45 toward the distal end thereof, as best shown in FIG. 6. The blade 50 is beveled adjacent a major portion of its side edges and along its leading edge, as shown at 51 and 52, respectively, in FIG. 6, tapering radially outwardly from the central portion of blade 50 and terminating in a relatively sharp edge 53 for easy penetration into a mastic material.

The bore 43 is counterbored as at 54 for accommodating the upper end of a helical spring 55 disposed about the shank 45 of element 46. The counterbore 54 defines an end wall 56 which serves as an abutment seat for the upper end of spring 55. The lower end of spring 55 bears against foot 50 for biasing the latter axially outwardly as limited by the bearing engagement of neck portion 48 against the upper flat surface of body portion 37.

The head 47 of lifter element 46 is pivotally mounted on a central portion of a pin or shaft 57 rigidly secured along its opposite ends to a pair of circular discs 58 disposed on opposite sides of head 47 in close proximity to the flat sides thereof. The shaft 57 is radially offset from the axes of the discs 58 to form therewith an eccentric. Thus, rotational movement of the discs 58 effects arcuate movement of the shaft 57 about the disc axes to, in turn, effect vertical movement of the element 46 as guided by axial movement of the shank 45 within bore 43. Because the shank 45 is confined within bore 43, the discs 58 will bodily shift or translate slightly in a horizontal direction upon rotary movement thereof.

Figure 7:
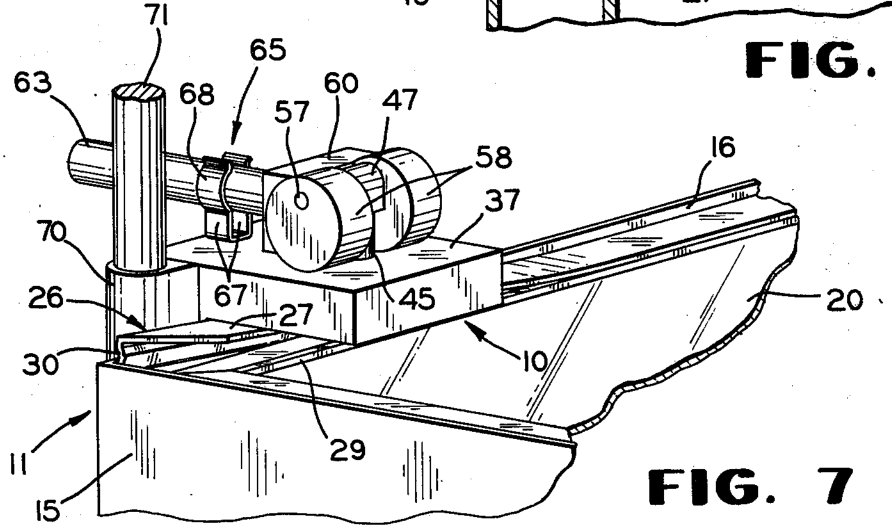
FIG. 7 is a view similar to FIG. 4, but showing the tool in another position of use.

A block 60 having an inner central flat surface 61 and inner arcuate surfaces 62 on opposite sides of surface 61 complementary to the rear flat surface of head 47 and the peripheral surfaces of discs 58, respectively, is welded or otherwise fixedly secured therealong. An elongated lever or handle 63 is affixed to the block 60 for facilitating manual rotation of the discs 58 about their axes, as well as bodily movement thereof in a horizontal plane about the vertical axis defined by shank 45. This arrangement enables the discs 58 to be rotated 180° to vertically move the shaft 57 and thereby lifter element 46 between its lower and upper positions shown in full lines and in dotted lines, respectively, in FIG. 5. A U-shaped clip 65 is rigidly secured along its bight portion, as by means of a suitable fastener 66, to the upper surface of body portion 37 and is provided with spaced, upright resilient legs 67 formed with bowed portions 67 for receiving and securing the handle 63 therein when swung to its alternate position of use shown in FIG. 7.

A lug 70 is formed integral with body portion 38 and is axially bored for accommodating an elongated rod 71 provided at its opposite ends with suitable handles 72, which facilitates manual movement of the tool 10 bodily along solar collection 11 for a purpose that will presently become apparent.

Figure 2:
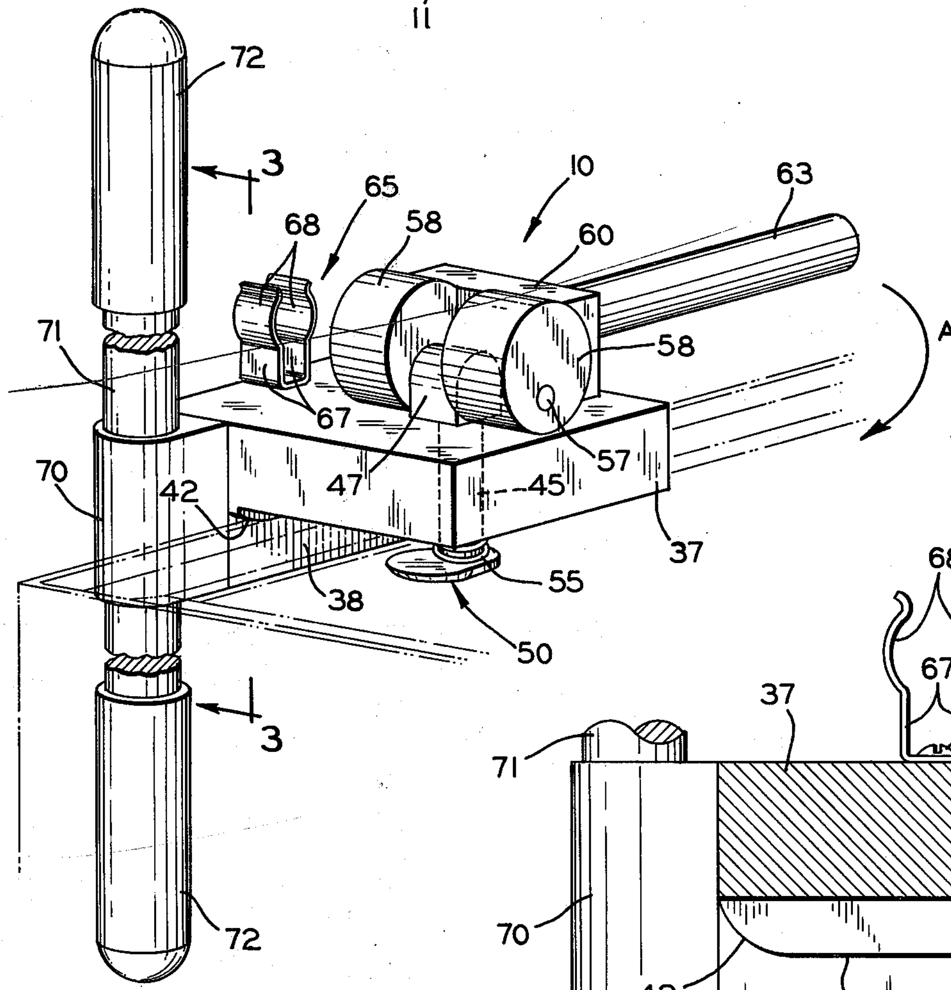
FIG. 2 is an enlarged, perspective view of the tool constructed in accordance with this invention.

In use for detaching a retainer cap to provide access into the solar collector, the tool 10 is placed on the latter with the shoulder 41 resting on the upper edge of a side wall of solar collection enclosure 12 with the handle 63 disposed in a horizontal position substantially parallel to such side wall as shown in FIG. 2. This also orients the foot or blade 50 in a direction generally parallel to the enclosure side wall and the inner edge of the flange 27 of retainer cap 26.

Figure 4:
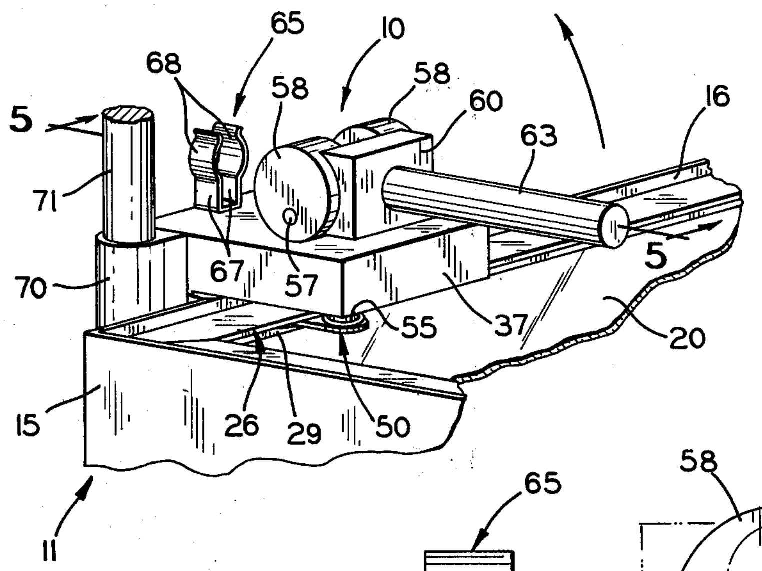
FIG. 4 is a perspective view of the portable tool of FIG. 1, shown in one position of use.

The handle 63 is then swung 90° in a clockwise direction, as indicated by arrow A in FIG. 2, causing the sharp edge 53 of blade 50 to bite into and penetrate the mastic material 29 below retainer cap flange 27 as shown in FIG. 5. Handle 63 is then swung upwardly 180°, in the direction of arrow B in FIG. 4, to rotate discs 58. As the handle 63 approaches the end of its arcuate movement, it engages between the clip legs 66, which will yield sufficiently to receive the handle 63 and then secure the same in the pocket formed by the bowed portions 67. Since the connecting shank 45 is affixed against translatory movement by guide bore 43, the rotating discs 58 move bodily a slight distance toward the left as viewed in FIG. 5, bearing against the upper flat surface of the body portion 37. Rotation of the discs 58 raises the eccentrically mounted shaft 57 along with shank 45 vertically, as guided by bore 43, to in turn urge blade 50 against the underside of retainer cap flange 27. The upward prying force of blade 50 directed against the underside of flange 27 creates tensile stresses in the mastic material 29 sufficient to rupture the same in the region of blade 50, breaking the sealed retainer cap 26 loose from the outboard panel 20 and raising it upwardly. At the same time, this upwardly directed force transmitted to leg 30 sufficiently deflects the resiliently yieldable bowed leg 30 to disengage its shoulder 35 from behind the undercut portion of formation 32 and allow the same to pass upwardly through recess 30 for detaching the retainer cap 26 from enclosure 12.

Once the mastic material 29 is initially ruptured and retainer cap 26 disconnected in the area of blade 50, the entire tool 10 is manually moved along enclosure 12 in a stepwise fashion by rocking the tool on the curved surfaces 42 of shoulder 41 and incrementally taking successive bites into the mastic material and progressively lifting or prying portion of the flange 27 loose from its mounting with the blade 50 held against movement by virtue of the securement of handle 63 in clip 65. The tool is bodily rocked to and fro along the edge of the enclosure wall, each time advancing a step therealong. This movement is continued along the entire length of each side wall and each end wall to completely free the retainer cap 26 from its sealed connection with the outer panel 20 and its mechanical interlock with enclosure 12.

From the foregoing, it is apparent that the present invention fully accomplishes its intended objects and provides a novel tool implement for expediently detaching and removing an adhesively secured retainer cap from an enclosure to provide access thereto. The tool of this invention is particularly adapted for breaking loose retainer caps adhesively secured to glazing panels mounted in solar collector enclosures to permit glazing panel removal and replacement. However, it should be understood that the tool is not restricted to such use, but has utility in a wide variety of applications where desired to attach or loosen adhesively secured retaining frame members or structural components from their associated structure without damage to either. The tool is compact, durable, easy to use and can be readily manipulated and guided by hand.

It is to be understood that the form of the invention herewith shown and described is to be taken as an illustrative embodiment only of the same, and that various changes in the shape, size and arrangement of parts, may be restored to without departing from the spirit of the invention.

I claim:

1. A hand tool comprising: a base member having a bore therethrough, a lift element having a shank extending through said bore for free rotational movement therein about the axis of said shank, a blade secured to one end of said shank for movement therewith and extending generally radially therefrom, said blade being tapered radially outwardly toward the marginal edge thereof to form a sharp peripheral edge about a major portion thereof, means for biasing said blade away from said base member, means operatively connected to the other end of said shank for rotating said shank and thereby said blade, said last mentioned means including means for moving said lift element axially along said shank axis against said biasing means.

2. A hand tool according to claim 1, wherein said moving means comprises a pair of discs disposed on opposite sides of the other end of said shank and connected thereto by a common shaft extending through said discs and said other end of said shank, said shank being eccentrically mounted on said discs to effect axial movement of said shank and said blade toward said base member upon rotation of said discs, and a handle rigidly secured to said discs for facilitating rotation of said discs about said shaft and bodily movement of said discs about an axis coincident with the axis of said shank.

3. A hand tool according to claim 2, including means on said base member for securing said handle and thereby said blade in place in an operative position thereof.

4. A hand tool according to claim 1 for use in detaching an adhesively secured retainer member from a frame structure, wherein said base member comprises a first portion and a right angularly related second portion, said second portion having an elongated shoulder adapted to rest on the edge of the side wall of said frame structure, said shoulder having receding surfaces at the opposite ends thereof to permit rocking movement of said base member along said side wall edge.

5. A hand tool according to claim 4, including a rod projecting through said second portion and having handles at the opposite ends thereof for facilitating bodily movement of the tool along said side wall edge.

* * * * *

UNITED STATES PATENT AND TRADEMARK OFFICE

CERTIFICATE OF CORRECTION

PATENT NO. : 4,169,306

DATED : Oct. 2, 1979

INVENTOR(S) : Wallace F. Krueger

It is certified that error appears in the above-identified patent and that said Letters Patent are hereby corrected as shown below:

Col. 1, line 11, "collection" should be --collector--
line 49, "illustrated" should be --illustrative--
line 65, after "vertical" insert --sectional--
Col. 3, line 40, "portions" should be --portion--
line 44, "heat" should be --head--
Col. 4, line 34, "collection" should be --collector--
line 39, "collection" should be --collector--
Col. 5, line 13, "portion" should be --portions--

Signed and Sealed this

*Fifteenth* Day of *January 1980*

[SEAL]

*Attest:*

SIDNEY A. DIAMOND

*Attesting Officer* *Commissioner of Patents and Trademarks*